US006944245B2

United States Patent
Stewart et al.

(10) Patent No.: US 6,944,245 B2
(45) Date of Patent: Sep. 13, 2005

(54) MULTI-PASS INTERFERENCE REDUCTION IN A GSM COMMUNICATION SYSTEM

(75) Inventors: Kenneth A. Stewart, Grayslake, IL (US); Raja S. Bachu, Waukegan, IL (US); Michael E. Buckley, Grayslake, IL (US); Clint S. Wilkins, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/688,714

(22) Filed: Oct. 17, 2003

(65) Prior Publication Data

US 2005/0084045 A1 Apr. 21, 2005

(51) Int. Cl.[7] .............................................. H04B 1/10
(52) U.S. Cl. ..................... 375/350; 375/346; 375/348; 455/296; 455/306
(58) Field of Search ................................ 375/308, 348, 375/347, 350, 346, 340, 234, 232, 148, 147, 144; 455/306, 296; 348/607; 714/769

(56) References Cited

U.S. PATENT DOCUMENTS

| 5,933,768 | A | | 8/1999 | Skold et al. | |
|---|---|---|---|---|---|
| 6,026,130 | A | | 2/2000 | Rahmatullah et al. | |
| 6,044,111 | A | | 3/2000 | Meyer et al. | |
| 6,144,710 | A | * | 11/2000 | Chen et al. | 375/346 |
| 6,314,147 | B1 | * | 11/2001 | Liang et al. | 375/346 |
| 6,604,220 | B1 | * | 8/2003 | Lee | 714/769 |
| 2002/0131488 | A1 | | 9/2002 | Alpress et al. | |
| 2002/0131489 | A1 | | 9/2002 | Alpress et al. | |
| 2004/0161065 | A1 | * | 8/2004 | Buckley et al. | 375/350 |

FOREIGN PATENT DOCUMENTS

| WO | WO 98/16021 | 4/1998 |
|---|---|---|
| WO | WO 00/64061 | 10/2000 |
| WO | WO 01/50291 A1 | 7/2001 |

OTHER PUBLICATIONS

U.S. Appl. No. 10/366,106, filed Feb. 13, 2003, Buckley et al.

"Downlink GMSK Interference Suppression Performance Evaluation", 3GPP TSG GERAN #9, Seattle, WA, USA, Apr. $15^{th}$–$19^{th}$ 2002, Ericsson, 15 pages.

(Continued)

Primary Examiner—Shuwang Liu
Assistant Examiner—Ted M. Wang
(74) Attorney, Agent, or Firm—Hisashi D. Watanabe (57) ABSTRACT

An iterative method (400) and apparatus (200) for a receiver for reducing interference in a desired signal in a GSM communication system that use a finite-impulse-response filter combined with alternate quadrature component output selection for alternate linear equalization. The method includes inputting a burst of data of a received waveform including interference, training an alternate linear output filter with a midamble of known quadrature phase, providing an estimate of the desired signal by operating on the received waveform with the finite-impulse-response filter, generating log likelihood ratio estimates for a plurality of bits in the burst of data, selecting bits from the burst of data base upon a predetermined condition, and re-training the alternate linear output filter to provide a second improved estimate of the desired signal.

18 Claims, 4 Drawing Sheets

OTHER PUBLICATIONS

"Single Antenna Interference Cancellation in MS for GSM Networks", 3GPP TSG–GERAN #9, Seattle, WA, USA, Apr. $15^{th}$–$19^{th}$ 2002, Cingular Wireless, Philips Semidonductors, SBC Technology Resources, Inc., 4 pages.

"Laboratory & Field Testing of SAIC for GSM Networks", 3GPP TSG GERAN #11, Los Angeles, CA, USA, Cingular Wireless, Philips Semiconductors, 20 pages.

Piero Castoldi, Richardo Raheli and Giovanni Marion, "Efficient Trellis Search Algorithms for Adaptive MLSE on Fast Rayleigh Fading Channels", Dipartimento di Ingegneria del'Informazione, Universita di Parma, Parma—Italy, 1994 IEEE, 5 pages.

Abdulrauf Hafeez, Karl J. Molnar, Gregory E. Bottomley, "Co–Channel Interference Cancellation for D–AMPS Handsets", EECS Dept., U. of Michigan, Ericsson Inc., 1999 IEEE, 6 pages.

Hafedh Trigui and Dirk T.M. Slock, "Training Sequence Based Multiuser Channel Identification for Co–Channel Interference Cancellation in GSM", Insitu EURECOM, France, 1999 IEEE, 20 pages.

OMA Open Mobile Alliance "Download Architecture Version 1.0", Version Jun. 10, 2002, 24 pages.

* cited by examiner

MULTI-PASS INTERFERENCE REDUCTION IN A GSM COMMUNICATION SYSTEM

FIELD OF THE INVENTION

This invention relates generally to communication systems, and more particularly to reducing interference to a received signal in a communication system.

BACKGROUND OF THE INVENTION

Wireless communication systems have an ever-increasing use in transferring voice and data services. Such communication systems include the Global System for Mobile ("GSM") communication. However, stray signals, or signals intentionally introduced by frequency reuse methods, can interfere with the proper transmission and reception of voice and data signals and can lower capacity. As a result, a receiver must be capable of processing a signal with interference from at least one channel and extract the desired information sent to a user. It is well known that, for typical cell layouts, the major source of noise and interference experienced by GSM communication devices when the network is supporting a non-trivial number of users is due to co-channel or adjacent channel interference. Such noise sources arise from nearby devices transmitting on or near the same channel as the desired signal, or from adjacent channel interference, such as noise arising on the desired channel due to spectral leakage for example. Additionally, even in the case where no other signal interference is present, the received signal may consist of multiple copies of the transmitted data sequence for example due to multi-path channel conditions. This effect is sometimes referred to as self-interference.

Traditionally, the effects of multi-path channels are compensated either through the use of equalization methods, such as the Maximum Likelihood Sequence Estimation ("MLSE") which is usually implemented using the Viterbi algorithm, or the Decision Feedback Equalizer, or through filtering techniques. In the filtering approach, a desired signal symbol sequence can be estimated by adjusting the filter parameters. Classically, the filter parameters can be determined using the modulated symbol and training sequences contained within the desired signal using well known techniques, such as the Minimum Mean Square Error Block Linear Equalizer ("MMSE-BLE") for example, which operates on the complex values of the signal and generally can be implemented in the frequency and time domains.

Traditionally, interference cancellation techniques have focused on adjacent channel suppression by using several filtering operations to suppress the frequencies of the received signal that are not also occupied by the desired signal. Correspondingly, co-channel interference techniques have been proposed, such as joint demodulation, which generally require joint channel estimation methods to provide a joint determination of the desired and co-channel interfering signal channel impulse responses. Given known training sequences, all the co-channel interferers can be estimated jointly. However, this joint demodulation requires a large amount of processing power, which constrains the number of equalization parameters that can be used efficiently. Moreover, classical joint demodulation only addresses one co-channel interferer, and does not address adjacent channel interference.

Multiple antenna techniques have also been proposed but these can be complex in their terms of hardware implementation and therefore are mainly more suited to a base station application. Unfortunately, all of the above techniques are non-trivial in either implementation and/or complexity.

DETAILED DESCRIPTION OF THE PREFERRED EMBODIMENTS

Figure 1:
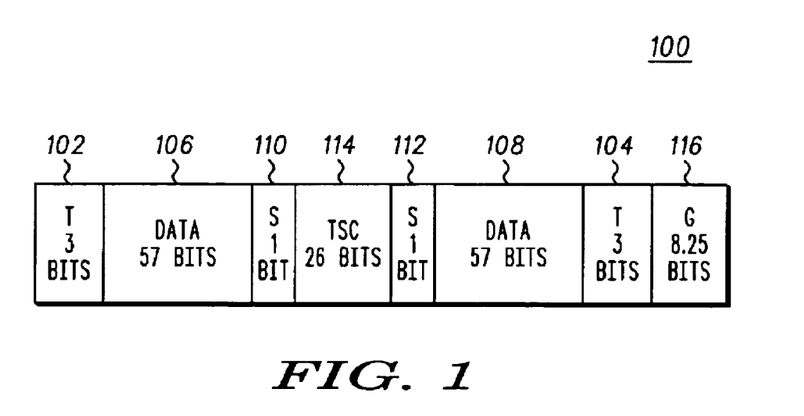
FIG. 1 is an exemplary format of the GSM normal burst.

The present invention reduces co-channel and adjacent channel interference in a communication system using a linear finite-impulse-response ("FIR") filter with reduced computational complexity without sacrificing interference cancellation performance. The present invention uses a filter specially adapted to the Gaussian Minimum Shift Keying ("GMSK") modulation used for GSM signals. However, the filter is applicable to any modulation with a generally constrained modulation constellation, and can be implemented with low complexity. The basic unit of transmission for both circuit- and packet-switched GSM logical channels is the normal burst (other burst formats are defined in GSM, but are reserved for signalling, frequency correction or other purposes). The format of an exemplary normal burst, which is illustrated in FIG. 1, comprises two tail bit fields ('T') 102 and 104 of length equal to 3 bits each, two encrypted data fields ("DATA") 106 and 108 of length—57 bits each, two stealing bit fields ("S") 110 and 112 of length—1 bit each, the midamble or training sequence code ("TSC") 114 of length 26 bits, and the guard interval ('G') 116 of nominal length 8.25 bits. The present invention uses quasi-linear processing, and further no additional hardware is required and processor requirements are reduced substantially compared to the traditional joint demodulation method. Specifically, a filter estimator is trained using symbols with a known specific phase in a received signal. More specifically, since the training symbols which comprise the midamble of length 26 bits are known to have a 90-degree phase difference and are therefore known to have only real or imaginary values, the training symbols provide a convenient means of estimating the optimal quasi-linear filter. Advantageously, by limiting the symbols to a constrained phase relationship, the complexity of calculations to be performed in order to linearly equalize the received signal is reduced. In the description below, any quantities $(.)^T$, $(.)^H$, $(.)^{-1}$ represent the transposition, conjugate transposition, and inversion of matrices, respectively, and bold letters indicate vectors or matrices. One can define b(k) as a desired user's transmitted data sequence of symbols where $$b(k) \in \begin{cases} \{\pm 1\}, k \in \{1, 3, 5, ...\} \\ \{\pm j\}, k \in \{2, 4, 6, ...\} \end{cases}$$

In other words, each transmitted symbol b(k) in the GSM system, when GMSK modulation is used, consists of either an in-phase (I) or a quadrature (Q) component. A known string of training symbols is defined for a burst of data with GMSK modulation in the GSM system. This string corresponds to a set of twenty six symbols referred to as the midamble or training sequence, b(k): k ∈{62, 63, . . . , 87}, that are known a priori, or known beforehand. The training sequence can be used to determine filter parameters to reduce interference, as will be described below.

Due to co-channel, self and/or adjacent channel interference, the desired sequence, b(k), can contain errors. The observation vector, y(k), comprises the actually observed received signal represented by y(k). Then the midamble of the received signal, y(62,63, . . . , 87), contains the actual received training sequence of the first hypothesized arriving ray of the received signal. An error is defined as the difference between the desired and received estimated sequence, b(k) and $\hat{b}(k)$, i.e. between what was originally sent and what is actually estimated by the receiver. A filter can be applied to the actually received signal, y(k), to minimize this error. For example, a complex linear estimate of b(k) may be defined as $$\hat{b}(k) = w^H \times y(k)$$

where $w=[w(0), w(1), \ldots, w(L-1)]^T$ is a vector of complex-valued filter taps, $y(k)=[y(k), y(k+1), \ldots, y(k+L-1)]^T$ is a sliding vector of received signal samples, and L is the number of taps of the filter. This complex linear tap estimate could then used with the observed signal to determine the error as follows $$Err = \sum_{k=62}^{87} |\hat{b}(k) - b(k)|^2$$

The traditional but less efficient approach for optimizing w is to minimize the complex sum-squared error, Err, using the known midamble training sequence bits.

However, the present invention takes advantage of the fact that it is known a priori that b(k) is either purely real or imaginary, as a result of the GMSK modulation. Therefore, improved performance can be obtained by minimizing the sum-squared error using the modified error metric $$Err_c = \sum_{k=62}^{87} |\hat{b}(k) - b(k)|^2$$

where the linear estimate $\hat{b}(k)$ is defined as:

$$\hat{b}(k) = \begin{cases} \text{real}(w^H y(k)), k \in \{1, 3, 5, \ldots\} \\ \text{imag}(w^H y(k)), k \in \{2, 4, 6, \ldots\} \end{cases}$$

where $\hat{b}(k)$ is now always purely real or purely imaginary. Therefore, a novel aspect of the present invention, distinct from the traditional approach to equalization, is that the real/imaginary portion of the k-th equalizer output is taken as an estimate of the non-zero (real/imaginary) portion of the data symbol b(k). This approach finds particular advantage, in that interference products, which are typically subject to fading, are therefore subject to phase rotation distinguishable from the real-only or imaginary-only values of $\hat{b}(k)$. The use of the fixed-phase, real/imaginary portions of the midamble, provides a distinction that can then be used to eliminate the interference products. Moreover, the use of only real/imaginary data in minimizing the sum-squared error simplifies calculations.

The linear estimator w can be optimized based on a least-squares estimate calculated using the following equation:

$$w = (Z^T Z)^{-1} Z^T t'$$

where w is a purely real vector of length 2L (for the particular case of symbol-spaced operation, and where the approach is readily extended to fractional filter tap-spacing) containing the L real values and the L imaginary values of the linear filter, t' is a vector containing the non-zero real and imaginary components of the training sequence of known symbols, and Z is the observation matrix of the received signal values. The matrix Z and the vector t' can be augmented by including the symbols used in the tail bits, which are also known to the receiver a priori. In the example below, a five tap filter is used (L=5). Therefore, each row of the Z observation matrix comprises five imaginary and five real values of y.

Letting $y_R(k)$, $w_R(k)$ and $b_R(k)$ denote the real part and $y_I(k)$, $w_I(k)$ and $b_I(k)$ denote the imaginary part of y(k), w(k) and b(k) respectively, then the optimal quasi-linear estimator w is solved by matrix inversion through the convolution of t' with Z in accordance with the above equation. In particular, the unknown impulse response w can be calculated through a well known relationship as the matrix product of $$w = R_{ZZ}^{-1} p$$

where $R_{ZZ} = Z^T Z$ is the autocorrelation matrix, and $p = Z^T t'$ is the cross-correlation vector, and where $$w = \begin{bmatrix} w_R(0) \\ \vdots \\ w_R(L-1) \\ w_I(0) \\ \vdots \\ w_I(L-1) \end{bmatrix} \quad \text{and} \quad t' = \begin{bmatrix} b_I(62) \\ b_R(63) \\ b_I(64) \\ b_R(65) \\ \vdots \\ b_I(86) \\ b_R(87) \end{bmatrix} \quad \text{and}$$

$$Z = \begin{bmatrix} y_I(62+L-1) & \cdots & y_I(62) & y_R(62+L-1) & \cdots & y_R(62) \\ y_R(63+L-1) & \cdots & y_R(63) & -y_I(63+L-1) & \cdots & -y_I(63) \\ y_I(64+L-1) & \cdots & y_I(64) & y_R(64+L-1) & \cdots & y_R(64) \\ y_R(65+L-1) & \cdots & y_R(65) & -y_I(65+L-1) & \cdots & -y_I(65) \\ \vdots & & \vdots & \vdots & & \vdots \\ y_I(65+L-1) & \cdots & y_I(86) & y_R(86+L-1) & \cdots & y_R(86) \\ y_R(87+L-1) & \cdots & y_R(87) & -y_I(87+L-1) & \cdots & -y_I(87) \end{bmatrix}$$

Having determined w, an initial optimized signal estimate $\hat{b}(k)$ can then be retrieved by $$\hat{b}(k) = \begin{cases} \text{real}(w^H y(k)), k \in \{1, 3, 5, \ldots\} \\ j \times \text{imag}(w^H y(k)), k \in \{2, 4, 6, \ldots\} \end{cases}$$

In this way, the filter is applied to the entire received data burst achieving co-channel and adjacent channel interference suppression through diversity in phase. After interference rejection, the equalized data may then be further processed in a known manner using Maximum Likelihood Sequence Estimation ("MLSE") techniques, or other known equalization methods, followed by soft-decision extraction, or soft decisions may be extracted directly. The process by which soft-decisions are generated is known, and is based on using an estimate of the residual interference and noise power to generate log-likelihood ratio (LLR) estimates for each symbol. To further enhance the interference reduction process, the observation matrix Z can be augmented by synthesizing additional data, which are not known a priori, using the following steps before entering the equalization or direct soft-decision extraction process.

Step 1: Process the received data using the quasi-linear estimator vector w to generate a vector of 116 log-likelihood ratio ("LLR") estimates corresponding to the burst data bits and stealing bits.

Step 2: Inspect the resulting LLR estimates and identify a group of N bits based upon a predetermined condition. Examples of the predetermined condition include, but are not limited to:
  a) N bits having largest LLR magnitudes;
  b) N bits having largest LLR magnitudes which are larger than a threshold magnitude; and
  c) N bits having LLR magnitudes larger than a threshold magnitude.

Step 3: Augment the observation matrix Z with the observation vectors, y(k), corresponding to the N bits identified in Step 2, and augment the training sequence vector, t' with the resulting hard decisions determined by observing the LLR magnitudes of the N bits.

Step 4: Re-compute the linear estimator vector, w, and re-process the received data using the re-computed linear estimator vector w to generate a vector of 116 log-likelihood ratio ("LLR") estimates corresponding to the burst data bits and stealing flags.

Step 5: Return to Step 2, and repeat the steps if desired.

Advantageously, the present invention does not require complex-conjugate manipulation of time or frequency shifting of signals to produce a corrected estimate of the desired signal. Moreover, linear combining of original, frequency-shifted, or complex-conjugate signals is not performed. Rather, the present invention makes use of the phase redundancy of the GMSK waveform by alternatively extracting, according to reference timing established for processing the received burst, the real or imaginary part of the result of processing the received signal with the generally complex-valued taps of the equalizing filter. Therefore, non-linear means are used, founded through linear equalization methods. Further, the present invention is not based on considerations of cyclostationarity, but is instead constructed by making use of the signaling phase occupancy redundancy present in GMSK waveforms.

Optionally, the present invention can multiplex the real and imaginary components of the received signal upon entry to the filter. In summary, only the real or imaginary portion of the filtering operation is retained. It is therefore computationally wasteful to compute the portion that is not retained. This filtering operation is achieved through the multiplexing procedure described below. In brief, computations are performed for either $(w_r^T y_r(k) + w_i^T y_i(k))$ when the output is purely real or $(w_r^T y_i(k) - w_i^T y_r(k))$ when the output is purely imaginary. This multiplexing can be used as a means for further reducing computational complexity and to increase the efficiency of the filter. This multiplexing is embodied in the present invention by noting that the output of the filter is alternately selected as the real and imaginary components. Noting that, if at a time k the filter output x(k) is expressed as:

$$x(k) = w^H y(k)$$
$$= (w_r + jw_i)^H (y_r(k) + jy_i(k))$$
$$= (w_r - jw_i)^T (y_r(k) + jy_i(k))$$
$$= (w_r^T y_r(k) + w_i^T y_i(k)) + j(w_r^T y_i(k) - w_i^T y_r(k))$$

From the above, it can be seen that alternatively selecting the real and imaginary parts of the filter output can be viewed as equivalent to loading, in alternating fashion, the real and imaginary parts of the received signal y(k) into the real-valued filter apparatus used to form the respective inner products with the real and imaginary parts of the filter taps. In other words, if the data vectors loaded into the filters $w_r$ and $w_i$ at time k are $y_r$ and $y_i$, respectively, then the vectors loaded into $w_r$ and $w_i$ at time k+1 are $y_i$ and $-y_r$.

Figure 2:
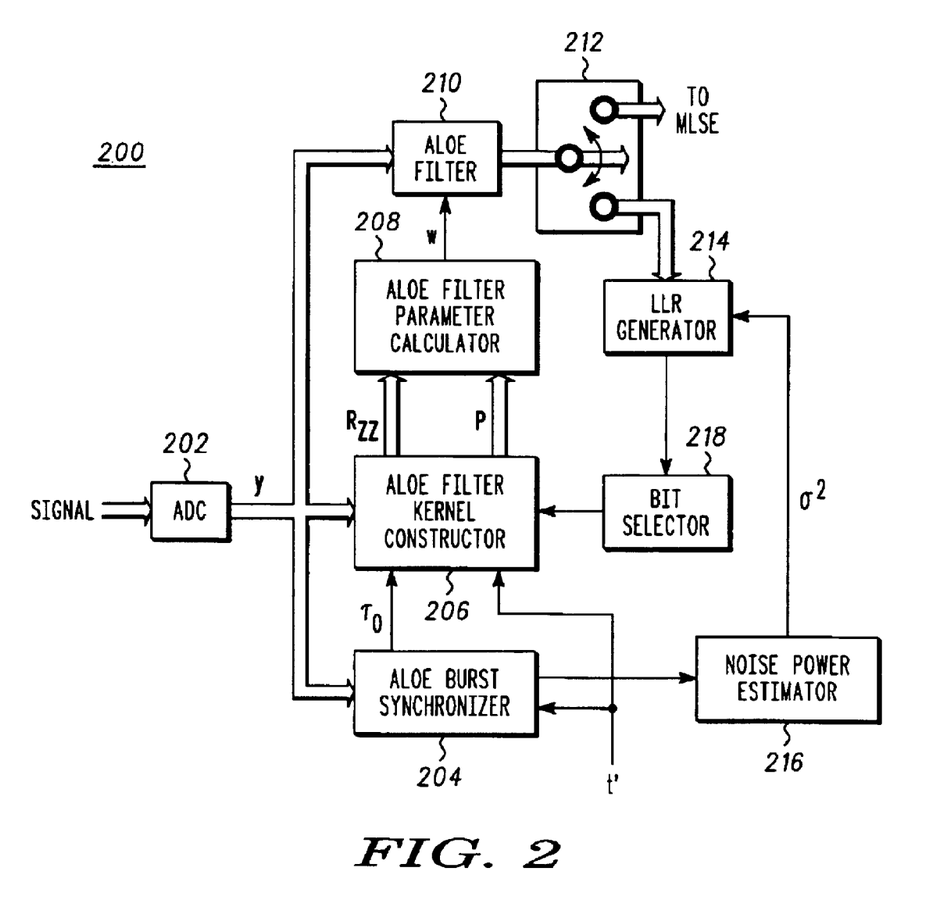
FIG. 2 is an exemplary block diagram of a receiver with an alternate linear output equalizer filter, in accordance with the present invention.

FIG. 2 illustrates an exemplary receiver 200 with an alternate linear output equalizer ("ALOE") filter, for reducing interference in a desired signal in a GSM communication system in accordance with the present invention. In FIG. 2, thick lines represent the flow of complex values and thin lines represent real values. The front end of the receiver 200 has a conventional configuration, which is well known in the art, and therefore elements such as frequency converters etc. are not shown for simplicity. An analog-to-digital converter 202 ("ADC") is configured to convert an input signal that includes a desired signal and a co-channel interferer or adjacent channel interferer signal into an input digital waveform, y. Typically, one or more ADCs can be provided, such as for the digital conversion of in-phase (I) and quadrature (Q) data, as is known in the art.

A burst synchronizer 204 is configured to receive the digital waveform, y, and to determine a synchronization delay, $\tau_0$, between the signals from the desired user and the co-channel interferer. Generally, the synchronization delay, $\tau_0$, includes an approximate or coarse synchronization from a tracking function, and a fine delay determination, both using techniques known in the art. A matrix kernel constructor 206 is coupled to the burst synchronizer 204. The matrix kernel constructor 206 assembles the observation matrix Z from the midamble portion of the input digital waveform and corrects for timing using the synchronization delay, $\tau_0$. The matrix kernel constructor 206 then computes autocorrelation matrix $R_{ZZ}=Z^T Z$ and cross-correlation vector $p=Z^T t'$. The present invention also envisions the use of one or more leading zeros and ending zeros of a burst of waveform data for filter training since zeros also present a fixed phase relationship. The leading and ending zeroes can be used in addition to, or instead of, the midamble.

The autocorrelation matrix, $R_{ZZ}$, and the desired cross-correlation vector, p, are then passed to a filter parameter calculator 208 coupled to the matrix kernel constructor 206. The filter parameter calculator 208 is configured to receive the autocorrelation matrix, $R_{ZZ}$ and the desired cross-correlation vector, p, to define linear tap estimates, w, for the alternate linear output equalizer ("ALOE") filter 210. The ALOE filter 210, which is a finite-impulse-response ("FIR") filter, is coupled to and receives signals from both the ADC 202 and the filter parameter 208. The output of the ALOE filter 210 is coupled to an output selector 212, which selects the signal path. The output selector 212 can select a first signal path for further signal processing in an equalizer such as a Maximum Likelihood Sequence Estimator ("MLSE"). For a second path, the output selector 212 is coupled to a log-likelihood ratio ("LLR") generator 214, which is configured to process the received signal y using the linear tap estimates w and the noise and interference power estimate $\sigma^2$ to generate a vector of 116 LLR estimates corresponding to the burst data bits and stealing bits. The noise and interference power estimate $\sigma^2$ is generated by a noise power estimator 216 based upon information received from the burst synchronizer 204. A bit selector 218 is coupled to the LLR generator 214, and is configured to receive the generated LLR estimates from the LLR generator 214. The bit selector 218 inspects the generated LLR estimates, and identifies a group of N bits, a predetermined number of bits, based upon a predetermined condition. Examples of the predetermined condition include, but are not limited to:

a) N bits having largest LLR magnitudes;
b) N bits having largest LLR magnitudes which are larger than a threshold magnitude; and
c) N bits having LLR magnitudes larger than a threshold magnitude.

The selected N bits from the bit selector 218 are then passed back to the matrix kernel constructor 206 to augment the observation matrix Z with the observation vectors, y(k), corresponding to the N bits identified in the bit selector 218. With the training sequence vector, t', and optionally including the tail symbols, hard decisions corresponding to the LLR magnitudes of the N bits are provided. The linear tap estimate, w, is then re-computed in the filter parameter calculator 208, and the received data using the re-computed linear tap estimates, w, re-processed in the ALOE filter 210. If desired, the re-processed received data y(k) may be used to generate another vector of 116 log-likelihood ratio ("LLR") estimates corresponding to the burst data bits and stealing bits, and the process may be repeated.

Figure 3:
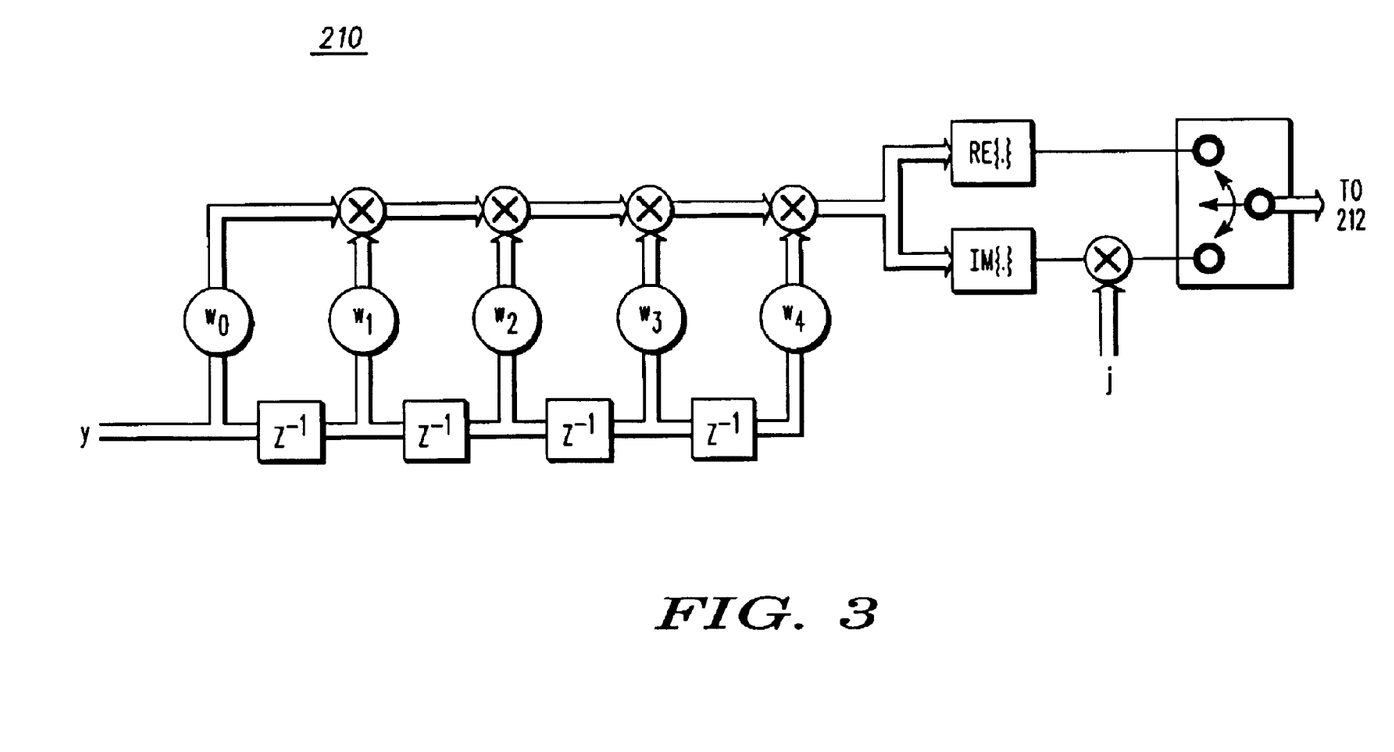
FIG. 3 is an exemplary block diagram of the alternate linear output equalizer filter of FIG. 2.

As detailed in FIG. 3, the FIR filter 210 is operable to input the tap parameters, $w_i$, (shown here as five taps separated by one-symbol delays, $z^{-1}$) to operate on the waveform and also to output alternating real values of the real and imaginary components of the waveform to alternately linearly equalize the waveform to provide an estimate of the desired signal. This equalized signal may then be used directly to determine soft decision values, or processed in an equalizer such as a Maximum Likelihood Sequence Estimator ("MLSE") for example, using techniques known in the art to output the estimated data sequence.

In practice, the burst of waveform data is GMSK modulated, which is used to advantage for the training sequence in that the midamble consists of alternating real and imaginary symbols, which are extracted by alternate switching, for training the finite-impulse-response filter. The present invention can also make use of one or more of the three leading zeros and three tail zeros of a burst of waveform data as a portion of the filter training sequence since those zeros also present a fixed phase relationship. These can be used in addition to, or instead of, the midamble. The filter parameter calculator 208 minimizes the sum-squared error between a linear real estimate of the real and imaginary components of the training sequence of the filter and the received waveform, as explained previously.

Figure 4:
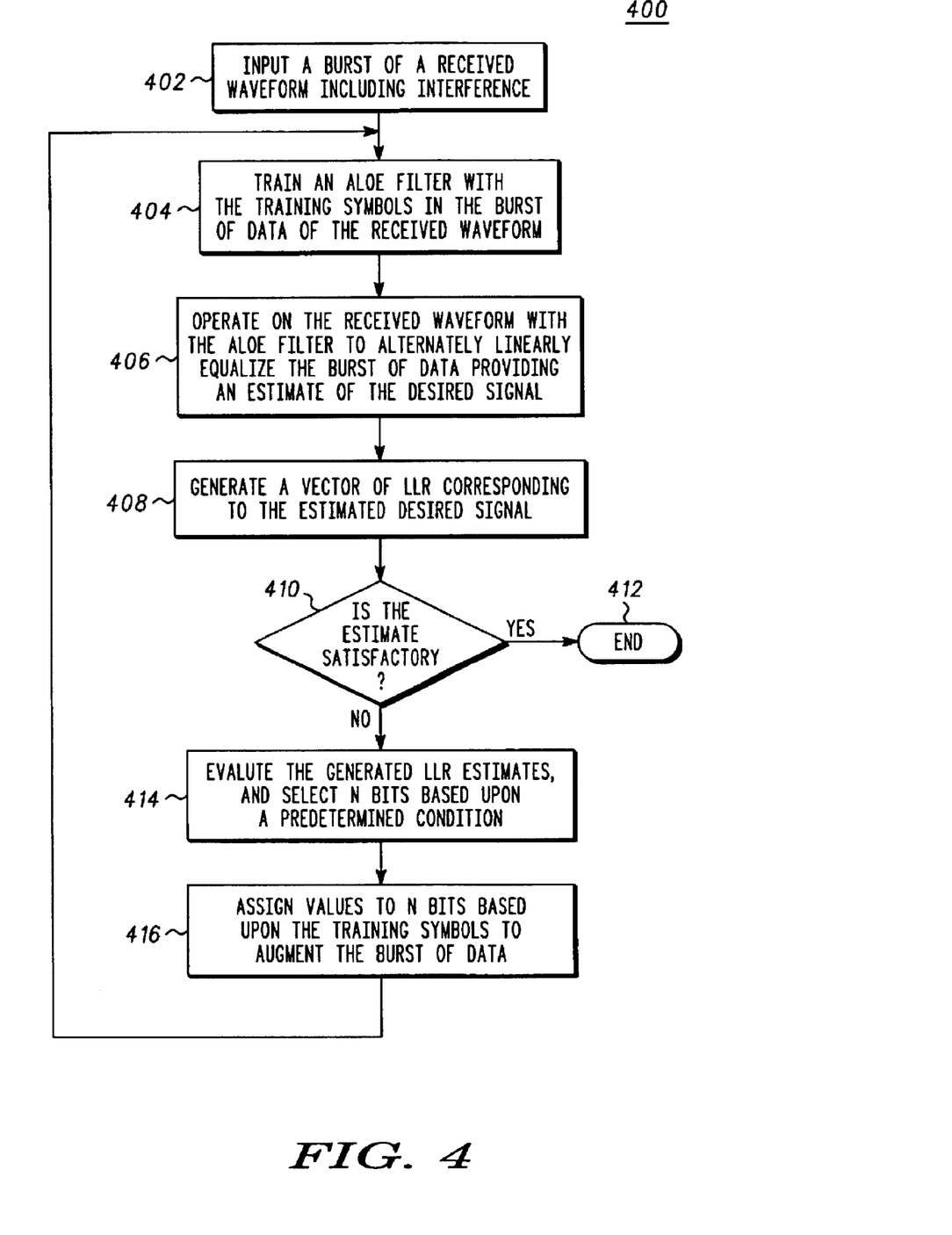
FIG. 4 is an exemplary flowchart for describing a method for alternate linear output equalization, in accordance with the present invention.

FIG. 4 is an exemplary flowchart 400 describing a method for reducing interference in a desired signal in a GSM communication system using an alternate linear output ("ALOE") filter, which is a finite-impulse-response filter, for alternate linear equalization, in accordance with the present invention. The method begins in block 402 by inputting a burst of data of a received waveform including interference from a channel of the communication system. In block 404, the ALOE filter is trained with a set of symbols of specific quadrature phase, known a priori, in the burst of data of the received waveform from block 402. For example, known real and imaginary components are alternatively selected from a midamble of a GMSK data burst. The set of symbols used for training, or the training symbols, can include one or more of leading zeros and ending zeros of the burst of data. The inclusion of the leading and/or ending zeros can be in addition to the midamble or instead of the midamble. Preferably, the set of symbols used for training are the midamble of the burst of data. The use of the midamble of the burst is most applicable where the burst of data is GMSK-modulated since the midamble symbols only consist of a real or an imaginary-valued component, wherein the training step extracts the alternating non-zero real and imaginary components of the midamble symbols for training the ALOE filter. These components are then used in minimizing the sum-squared error between a linear real estimate of the real and imaginary components of the training sequence of the ALOE filter and the received waveform.

In block 406, the received waveform is operated on with the ALOE filter to alternately linearly equalize the burst of data to provide an estimate of the desired signal. Optionally, the operating step includes a substep of multiplexing the real and imaginary components of the received signal upon entry to the filter. In step 408, the ALOE filter output samples are processed to generate log-likelihood ratio ("LLR") values. These LLR values of the desired signal are then evaluated to determine whether they are satisfactory based upon a predetermined requirement in block 410. Examples of the predetermined requirement in block 410 include a preselected fixed number of iterations, comparison of current LLR values to previously obtained LLR values, or any other relevant conditions. If the resulting estimate is determined to be satisfactory, then the process terminates in block 412, which could, for example, represent further processing of the LLR values by a forward error correction decoder such as a convolutional code decoder. Otherwise, the resulting estimate of the desired signal is used to generate a vector of 116 log-likelihood ratio ("LLR") estimates corresponding to the burst bits and stealing bits in block 414. The generated LLR estimates are then evaluated based upon a predetermined condition. A group of N bits, which is a predetermined number, is also selected based upon the predetermined selection condition in block 414. Examples of the predetermined selection condition include, but not limited to, N bits having largest LLR magnitudes; N bits having largest LLR magnitudes which are larger than a threshold magnitude; and N bits having LLR magnitudes larger than a threshold magnitude.

The selected N bits are then assigned values based upon hard decisions provided by the training symbols to augment the burst of data in block 416. The selected N bits are then passed back to block 404 augmenting the burst of data of the received waveform and the set of available training symbols, to re-train the ALOE filter, and the process is repeated.

EXAMPLE

A numerical simulation was performed in accordance with the present invention. The results are provided below. Simulation data represents a single random GMSK interferer in a typical urban (TU) environment, with a user velocity of 3 kilometers per hour, where ideal frequency hopping is assumed. The logical channel uses the Advanced Multirate ("AMR") speech encoder at 12.2 kbps, as specified in known ETSI standards. A frame error rate was calculated for several carrier-to-interference ratios.

Figure 5:
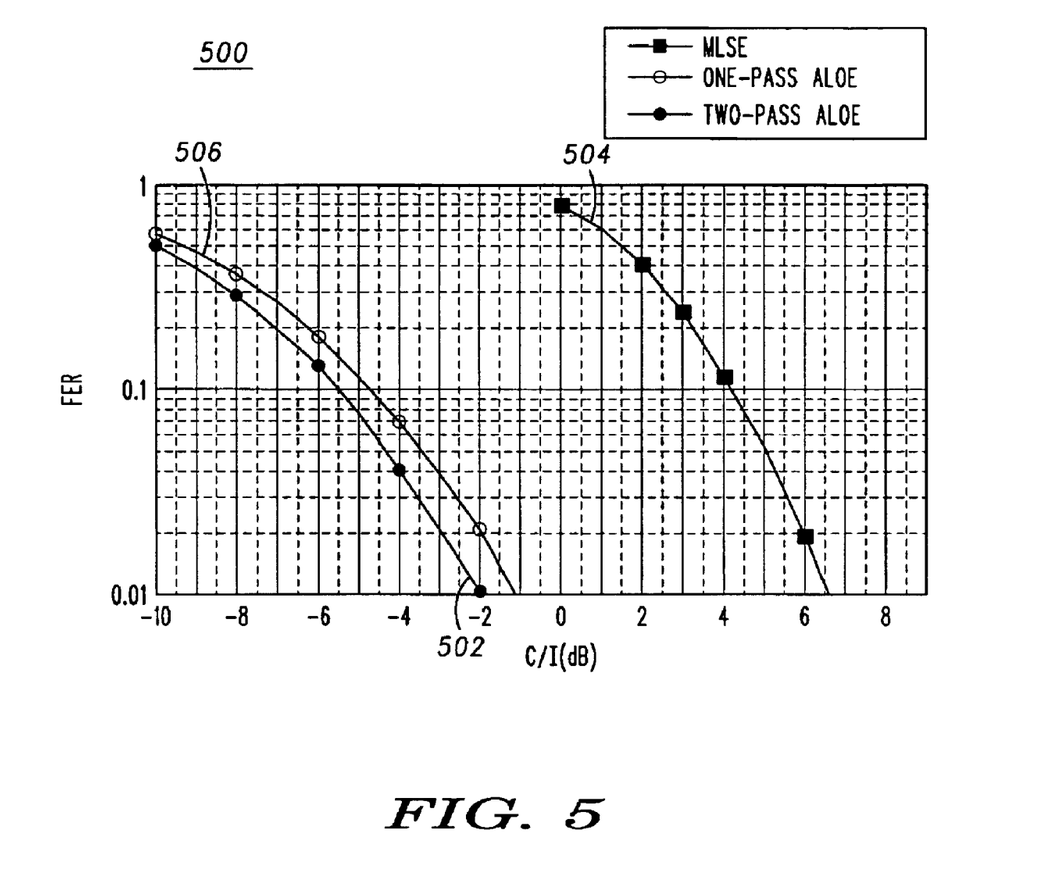
FIG. 5 is an exemplary graphical representation of the performance improvement provided by the present invention.

FIG. 5 shows a graph 500 of the results indicating frame-error-rate ("FER") versus carrier/interference ratio ("C/I") in an operating environment as specified above. A conventional receiver (conventional MLSE Viterbi equalizer) is compared to a receiver incorporating the present invention using one-pass and two-pass processing. For the two-pass processing, additional six symbols identified as having the largest LLR magnitudes from the one-pass processing were used. As can be seen, the present invention provides an improved frame error rate 502 (shown as the left-most curve) over the prior art conventional receiver 504 (shown as the right-most curve), and over the one-pass processing receiver 506 (shown as the middle curve). In addition, this process is accomplished with much fewer calculations compared to the conventional receiver as described previously.

In review, the present invention reduces co-channel, self and adjacent channel interference in a TDMA or GSM communication system, and in particular for GMSK modulation, using a finite-impulse-response filter alternate linear output equalization that reduces computational complexity without sacrificing performance. No additional hardware is required and processor resource requirements are reduced. While specific components and functions of the present invention are described above, fewer or additional functions could be employed by one skilled in the art and be within the broad scope of the present invention. The invention should be limited only by the appended claims.

What is claimed is:

1. An iterative method for reducing interference in a desired signal in a GSM communication system using an alternate linear output filter, the method comprising:

inputting a burst of data of a received waveform including interference from a channel of the communication system;

training the alternate linear output filter with a set of symbols of specific quadrature phase, known a priori, in the burst of data of the received waveform;

operating on the received waveform with the alternate linear output filter to alternately linearly equalize the burst of data to provide an estimate of the desired signal;

generating log likelihood ratio estimates for a plurality of bits corresponding to the burst of data;

selecting a predetermined number of bits from the plurality of bits based upon a predetermined condition of the generated log likelihood ratio estimates associated with the plurality of bits;

augmenting the burst of data by assigning values to the selected predetermined number of bits based on the set of symbols of specific quadrature phase;

further re-training the alternate linear output filter with the augmented set of symbols; and further re-operating on the received waveform with the alternate linear output filter to alternately linearly equalize the burst of data to provide an improved estimate of the desired signal.

2. The method of claim 1, wherein the set of symbols of specific quadrature phase used for training the alternate linear output filter as a training sequence include at least one of:

midamble symbols of the burst of data;

a set of leading zeros of the burst of data; and a set of ending zeros of the burst of data.

3. The method of claim 1, wherein the predetermined condition of the generated log likelihood ratio estimates for selecting the predetermined number of bits is based upon at least one of:

magnitudes of largest generated log likelihood ratio estimates of the plurality of bits;

magnitudes of largest generated log likelihood ratio estimates of the plurality of bits exceeding a threshold magnitude; and magnitudes of generated log likelihood ratio estimates of the plurality of bits exceeding a threshold magnitude.

4. The method of claim 3, wherein the burst of data is GMSK modulated, and wherein alternating non-zero real and imaginary components of the midamble symbols of the burst of data are extracted by training the alternate linear output filter.

5. The method of claim 4, wherein training the alternate linear output filter includes minimizing a sum-squared error between a linear real estimate of the real and imaginary components of the training sequence of the alternate linear output filter and the received waveform.

6. The method of claim 1, wherein operating an the received waveform with the alternate linear output filter includes multiplexing real and imaginary components of the received waveform upon entry into the alternate linear output filter in vector fashion.

7. An iterative method for reducing interference in a desired signal in a GSM communication system using an alternate linear output filter, the method comprising:

inputting a burst of data of a received GMSK waveform including interference from a channel of the GSM communication system;

training the alternate linear output filter with a set of alternating non-zero real and imaginary components of a training sequence, known a priori, in the burst of data of the received GMSK waveform;

operating on the received GMSK waveform with the alternate linear output filter to alternately linearly equalize the burst of data of the received GMSK waveform to provide an estimate of the desired signal;

generating log likelihood ratio estimates for a plurality of bits corresponding to the burst of data of the received GMSK waveform;

selecting a predetermined number of bits from the plurality of bits based upon a predetermined condition of the generated log likelihood ratio estimates associated with the plurality of bits;

augmenting the burst of data by assigning values to the selected predetermined number of bits based on the set of alternating non-zero real and imaginary components of midamble symbols;

further re-training the alternate linear output filter with the augmented set of alternating non-zero real and imaginary components; and further re-operating on the received GMSK waveform with the alternate linear output filter to alternately linearly equalize the burst of data of the received GMSK waveform to provide an improved estimate of the desired signal.

8. The method of claim 7, wherein the training sequence includes at least one of:

midamble symbols of the burst of data;

a set of leading zeros of the burst of data; and a set of ending zeros of the burst of data.

9. The method of claim 8, wherein the predetermined condition of the generated log likelihood ratio estimates for selecting the predetermined number of bits is based upon at least one of:

magnitudes of largest generated log likelihood ratio estimates of the plurality of bits;

magnitudes of largest generated log likelihood ratio estimates of the plurality of bits exceeding a threshold magnitude; and magnitudes of generated log likelihood ratio estimates of the plurality of bits exceeding a threshold magnitude.

10. The method of claim 9, wherein training the alternate linear output filter includes minimizing a sum-squared error between a linear real estimate of the real and imaginary non-zero components of the training sequence of the alternate linear output filter and the received GMSK waveform.

11. The method of claim 7, wherein operating on the received GMSK waveform with the alternate linear output filter includes multiplexing non-zero real and imaginary components of the received GMSK waveform upon entry into the alternate linear output filter in vector fashion.

12. A receiver with an alternate linear output equalizer for reducing interference in a desired signal in a GSM communication system, the receiver comprising:

an analog-to-digital converter configured to convert an input signal that includes the desired signal and an interference signal to a digital waveform;

a burst synchronizer coupled to the analog-to-digital converter, the burst synchronizer configured to receive the digital waveform and to determine a synchronization delay between the desired signal and the interference signal;

a matrix kernel constructor coupled to the analog-to-digital converter and the burst synchronizer, the kernel constructor configured to receive the digital waveform, the delay, and a real set of a training sequence derived from the digital waveform to construct an autocorrelation matrix and a cross-correlation vector;

a filter parameter calculator coupled to the kernal constructor, the filter parameter calculator configured to receive the autocorrelation matrix and the cross-correlation vector to define linear tap estimates;

an alternate linear output filter coupled to the filter parameter calculator and the analog-to-digital converter, the alternate linear output filter configured to receive the linear tap estimates to operate on the digital waveform and output alternating real only and imaginary only symbols to provide an estimate of the desired signal;

a log likelihood ratio generator coupled to the alternate linear output filter, the log likelihood ratio generator configured to generate log likelihood ratio estimates for a plurality bits of the digital waveform; and a bit selector coupled to the log likelihood ratio generator and to the matrix kernel constructor, the bit selector configured to select a predetermined number bits from the plurality of bits based upon a predetermined condition of the generated log likelihood ratio estimates associated with the plurality of bits, the bit selector further configured to provide the selected predetermined number of bits to the matrix kernel constructor to augment an observation matrix and the training sequence.

13. The receiver of claim 12, further comprising:

an output selector coupled to an output of the alternate linear output filter, the output selector configured to direct the output alternating real only and imaginary only symbols frown the alternate linear output filter to one of the log likelihood ratio generator and an equalizer; and a noise power estimator coupled to the log likelihood ratio generator, the noise power estimator configured to provide an estimated noise power of the input signal.

14. The method of claim 13, wherein the training sequence includes at least one of:

midamble symbols of the burst of data;

a set of leading zeros of the burst of data; and a set of ending zeros of the burst of data.

15. The method of claim 14, wherein the predetermined condition of the generated log likelihood ratio estimates for selecting the predetermined number of bits is based upon at least one of:

magnitudes of largest generated log likelihood ratio estimates of the plurality of bits;

magnitudes of largest generated log likelihood ratio estimates of the plurality of bits exceeding a threshold magnitude; and magnitudes of generated log likelihood ratio estimates of the plurality of bits exceeding a threshold magnitude.

16. The receiver of claim 15, wherein the burst of data is GMSK modulated.

17. The receiver of claim 16, wherein the fitter parameter calculator minimizes sum-squared error between a linear real estimate of the real only and imaginary only symbols of the training sequence of the alternate linear output filter and the digital waveform.

18. The receiver of claim 15, wherein the alternate linear output filter multiplexes real and imaginary components of the digital waveform upon entry thereto.

* * * * *